United States Patent [19]
Hickerson

[11] Patent Number: 5,165,576
[45] Date of Patent: Nov. 24, 1992

[54] DISPENSER FOR MEASURED QUANTITIES OF LIQUID

[76] Inventor: Frederick R. Hickerson, R.D. 6 Box 530, Newton, N.J. 07860

[21] Appl. No.: 777,656

[22] Filed: Oct. 16, 1991

[51] Int. Cl.⁵ ............................................... B67D 5/38
[52] U.S. Cl. .................................... 222/158; 222/442; 222/454; 222/484
[58] Field of Search ............... 222/158, 442, 454, 456, 222/484, 510

[56] References Cited

U.S. PATENT DOCUMENTS

| | | | |
|---|---|---|---|
| 844,686 | 2/1907 | Marschall | 222/158 |
| 2,402,310 | 6/1946 | Beaumier | 222/510 X |
| 3,141,585 | 7/1964 | Emmert | 222/510 X |
| 4,171,075 | 10/1979 | Gangwisch | 222/456 |
| 4,298,038 | 11/1981 | Jennings | 141/2 |
| 4,646,948 | 3/1987 | Jennings | 222/454 |
| 4,860,927 | 8/1989 | Grinde | 222/158 |
| 4,893,732 | 1/1990 | Jennings | 222/109 |
| 5,044,527 | 9/1991 | Hickerson | 222/451 |
| 5,054,656 | 10/1991 | Lasner | 222/158 |

FOREIGN PATENT DOCUMENTS 143978 12/1935 Fed. Rep. of Germany ...... 222/158

Primary Examiner—Gregory L. Huson

[57] ABSTRACT

A dispenser for liquids comprising two compartments with a closure to allow filling of the container by the product manufacturer and refilling of the container, as desired, by the purchaser or user of the product. The reservoir compartment of the container, having a relatively large volume, is the main structural part of the container which keeps the container standing and also supports the smaller volume dispensing compartment which extends outwardly from the top portion of the container. The dispenser compartment has an attached vertically positioned dispenser containing: a push button, a small spring, a rod and a rod guide. The push button, when pressed, initiates fluid flow from the reservoir compartment. When the pressure on the bottom is released, the return spring, which is coiled around the upper portion of the rod and compressed between the underside of the push button and the upper end of the guide, forces the push button to its closed position. The rod, which is attached to the inside of the push button, has a lower end valve portion which seats in an outlet port of the guide. The push button has a rotational locking position which prevents accidental fluid flow or leakage from the dispenser compartment during storage and transportation. Visual observation of the fluid level through the translucent wall of the graduated reservoir compartment allows accurate control of the fluid volume being dispensed.

12 Claims, 4 Drawing Sheets

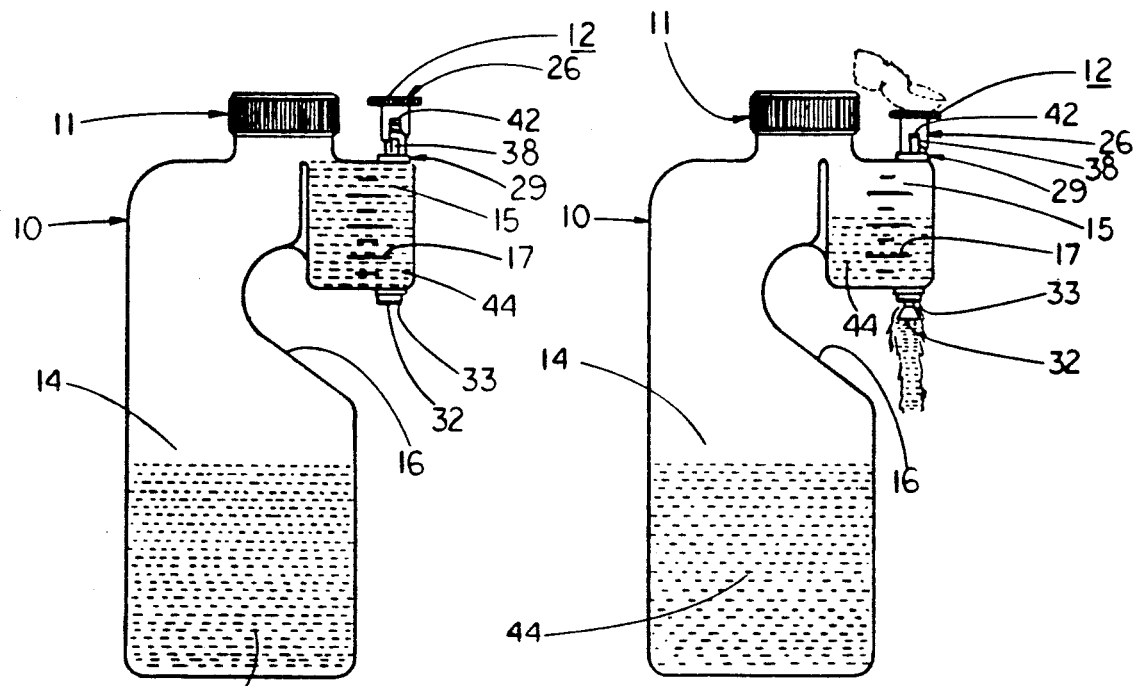
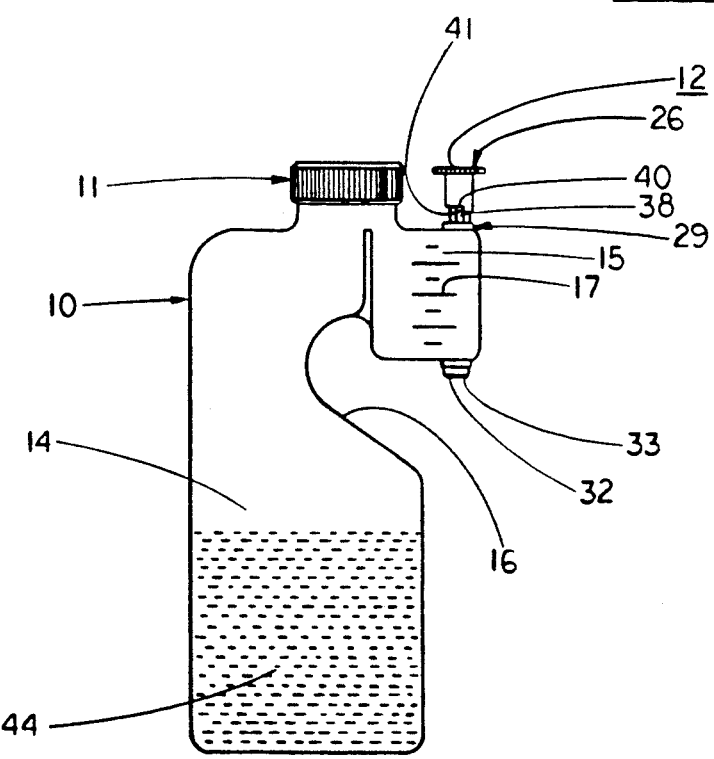

DISPENSER FOR MEASURED QUANTITIES OF LIQUID

FIELD OF USE

This invention relates to containers for dispensing liquids and more particular to containers dispensing measured quantities utilizing a push button to control liquid flow.

BACKGROUND OF INVENTION

Current attention to environmental concerns has caused an increase in efforts by industry to produce products which are less harmful to the environment. A part of these efforts are directed at reducing the volume of plastic containers being disposed of. Manufacturers of detergents, and the like, are endeavoring to produce more concentrated products to reduce amount and size of plastic containers and to also market products which encourage the use of refillable containers. This generation of new and improved products has intensified the need for a refillable container with a high accuracy selectable volume liquid dispenser measuring system.

There are many various types of containers with liquid measuring and dispensing systems disclosed in prior art. Most are either too complex to economically market or not acceptable to the user due to the complexity and difficulty in operating. Some of the dual compartment container systems, with both reservoir and dispenser compartments, require tricky tilting or other manipulations of the container to allow measured volume dispensing and are not capable of dispensing a selectable measured volume of fluid.

Squeezable container dispensing systems, that are designed so squeezing the container will force fluid up through a tubular passage into a separate but attached dispensing chamber, dispense relatively accurate measured volumes of fluid. The need for continually squeezing the container to fill the dispensing chamber, especially when the fluid level in the container is low, creates difficulty and is also time consuming and sometimes frustrating.

Some plastic containers for liquid soap and similar fluids utilize closures of the push and pull type for dispensing their contents. These closures are designed for the consumer or user to pull up on the top portion of the closure to open the container. The container is then turned upside down so that it may be squeezed to dispense the contents. When turned right side up, the top portion of the closure is pushed down to close the container.

In the above described dispensing system, the user must utilize both hands to open the closure, one hand to hold the container down and the other hand to pull up on the top portion of the closure. The remaining steps of the above described rather long sequence requires the use of only one hand.

In using these squeezable containers, another problem occurs as the contents of the container decreases to a point where a person must hold the container upside down for a longer period of time while shaking and squeezing to get the remaining contents out. Most often the consumer throws away the container and its remaining contents rather than taking the additional time required to empty the container. Throwing good liquid soap or other products away is not only wasteful but costly to the consumer.

Additionally, the amount of fluid being dispensed for each intended use can not be easily measured in the push and pull type closure dispensing systems. The only way a measurement can be made is to dispense the contents into some type of measuring cup. Most users just guess at the amount of fluid they need to dispense as they squeeze the container, since they don't want to take the time and effort associated with locating and using a separate measuring cup. Because of this, little control is maintained over the amounts of the product a person uses for similar jobs. Also, there is variation between users for similar jobs. Using too little of the product will result in not getting the job done right, while using too much will also adversly affect the job and is wasteful and costly.

The need exists for an economical, simple to operate, refillable container with a selectable measured volume liquid dispenser.

SUMMARY OF THE INVENTION

The main object of the present invention is to overcome the above problems and disadvantages of containers with liquid measuring dispensing systems including some squeezable plastic bottles with push - pull caps of the type described, by providing a greatly simplified and inexpensive method of dispensing fluids together with a capability to dispense any measured quantity desired. For an example, using the dispensing system invention to dispense liquid soap into a dish washing machine, the user can dispense any desired measured amount with relatively high accuracy. A dispenser compartment attached to and a part of the plastic container, has measuring marks in ounces and/or milliliters and has a translucent wall that allows viewing the level of the contents. In this way, exact measured quantities of fluid may be dispensed. The dispensing is accomplished by pushing a push button to start the liquid flow and releasing the push button to stop the flow. Refilling of the dispenser compartment is accomplished as necessary by merely tilting the container upside down for a second or two. The invention utilizes a push button system for dispensing and utilizes no pumps or suction devices.

An important object of the invention is to provide a gravity system liquid dispenser which is easy, convenient and desirable to use and pleasantly acceptable to the person buying and/or using the product. Only one hand is needed to push the button controlling the dispensing of the fluid and to hold and tilt the container as necessary to refill the dispenser compartment. Most all of the fluid can be dispensed with no waste since the last refill of the dispenser compartment will completely empty the container. No skaking or squeezing is required in dispensing as the contents of the dispenser compartment empties quickly when the push button is pressed.

Another important object of the invention is to provide a gravity system liquid dispenser which allows continuation of proven manufacturing technology and practices. The invention does not require any special, difficult or complicated production or assembly requirements.

The main advantage of the present invention is in its design simplicity and ease of operation to achieve an economical solution to the requirement for a selective measuring fluid dispensing system. The push button design used to open the dispenser valve, to allow gravity dispensing of the desired liquid volume, enhances the advantages of the invention.

BRIEF DESCRIPTION OF THE DRAWINGS

FIG. 7 is a vertical view, similar to FIG. 5, showing the container tilted back to the upright position with the dispenser compartment full of fluid.

FIG. 8 is a vertical view of the invention showing the push button depressed and the fluid exiting the dispenser compartment.

FIG. 9 is a vertical view of the invention with an empty dispenser compartment and the push button rotated to the locked position.

DESCRIPTION OF THE PREFERRED EMBODIMENTS

As previously noted, the present invention is a dispenser for measured quantities of liquid, is comprised of low cost components which have been designed for simplicity, ease of operation and reliability. All components can be molded from plastic material with the exception of the spring.

There is a container having two compartments with a closure to allow filling of the container by the product manufacturer and refilling of the container, as desired, by the purchaser or user of the product. The reservoir compartment of the container, having a relatively large volume, is the main structural part of the container which keeps the container free standing and also supports the smaller volume dispensing compartment which extends outwardly from the top portion of the container. The dispenser compartment has an attached vertically positioned dispenser containing: a push button, a small spring, a rod and a rod guide. The push button, when pressed, initiates fluid flow from the dispenser compartment. When the pressure on the button is released, the return spring, which is coiled around the upper portion of the rod and compressed between the underside of the push button and the upper end of the guide, forces the button to its closed position. The rod, which is attached to the inside of the push button, has a lower end valve portion which seats in an outlet port of the guide. The push button has a rotational locking position which prevents accidental fluid flow or leakage from the dispenser compartment during storage, transportation and other situations. Visual observation of the fluid level through the translucent wall of the graduated reservoir compartment allows accurate control of the fluid volume being dispensed.

Figure 1:
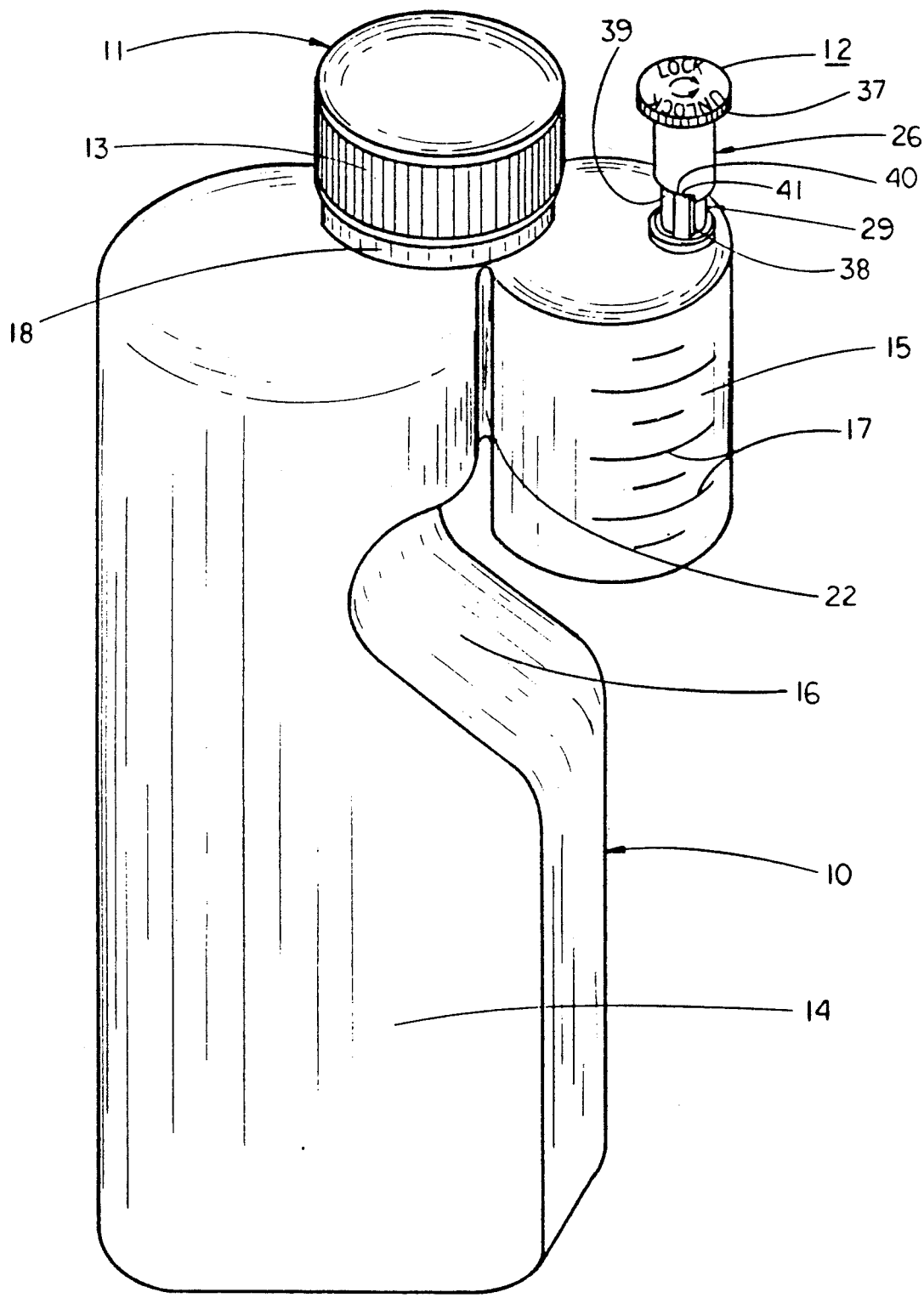
FIG. 1 is a perspective view of a dispenser for liquids embodying the invention.

Referring first to FIG. 1 there is a fluid container designated by numeral 10, preferably but not necessarily in the form of a molded plastic bottle, together with a closure cap 11 and an attached dispenser 12. A corrigated surface 13 on the outside periphery of the closure 11 allows hand gripping during tightening and removal procedures. Also illustrated in FIG. 1 are two connecting compartments in the container 10, a primary reservoir compartment 14 and a secondary dispenser compartment 15. A recess 16 in the container 10 is located in the upper middle portion of the container 10 adjacent to the dispenser compartment 15 and is designed for hand holding of the container 10. A plurality of graduation lines 17 on the dispenser compartment 15 allow visual observation of the fluid level in the dispenser compartment 15 since the container 10 is made from translucent plastic material. The graduation lines 17 provide liquid volume measurements in ounces and/or milliliters or fractions thereof and can be embossed or indented for easy viewing.

Figure 2:
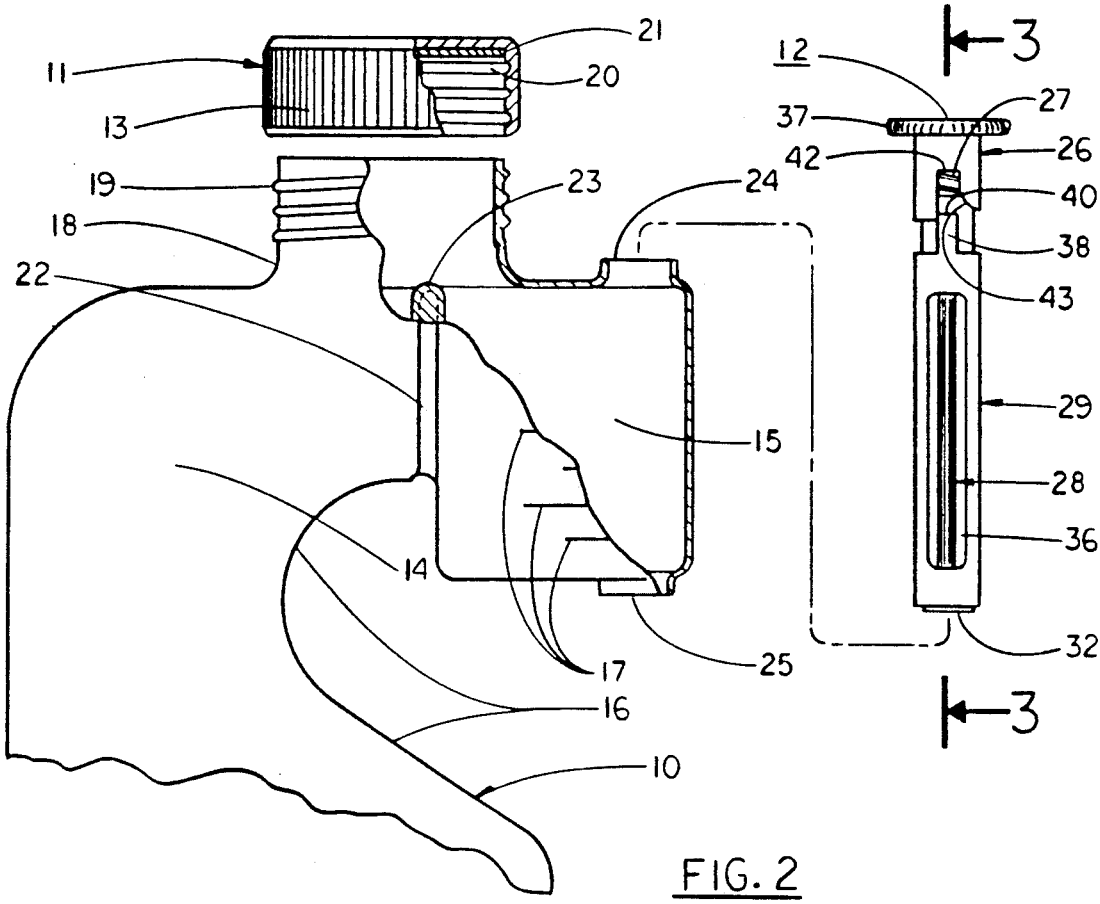
FIG. 2 is a vertical sectional view of the invention showing the container, closure and the dispenser separately.

As shown in FIG. 2, the container 10 has a centrally located circular neck portion 18 which contains a male thread 19. An internal thread 20, on the inside wall of the closure 11 is in the form of a groove extending about one and one half revolutions and is contoured to freely engage the male thread 19. A sealing disc 21 in the closure 11 enhances the sealing relationship between the closure 11 and the container 10.

FIGS. 1 and 2 show a relatively thin vertical web 22 on the upper middle portion of the container 10 which connects and supports the dispenser compartment 15 on the reservoir compartment 14. A horizontal barrier dam 23 inside the neck portion 18 of the container 10 is formed by the junction of the reservoir compartment 14 and the dispenser compartment 15 and separates these compartments. The dispenser compartment 15 is designed with a smaller volume capacity than the reservoir compartment 14 which is the main structural portion of the container 10.

In FIG. 2, an upper opening 24 and a lower opening 25 axially aligned in the dispenser compartment 15 of the container 10 provide for the postioning and sealing of the dispenser 12 in a liquid tight relationship into the dispenser compartment 15. This positioning and sealing may be accomplished by gluing, fusing or other liquid tight fastening methods or procedures.

Figure 3:
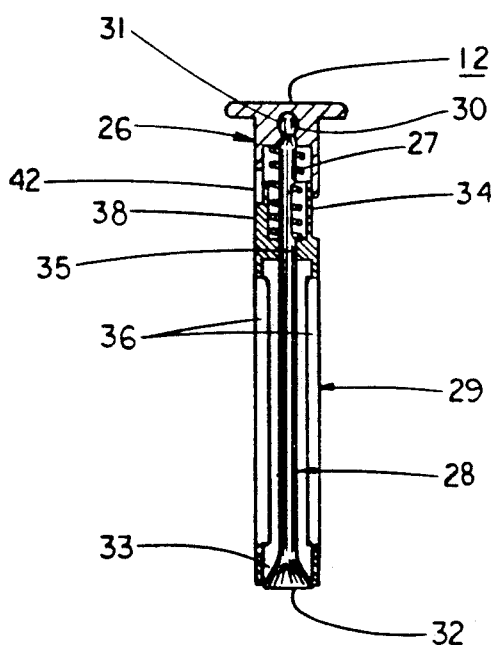
FIG. 3 is a vertical sectional view of the dispenser with the valve in the closed position.
Figure 4:
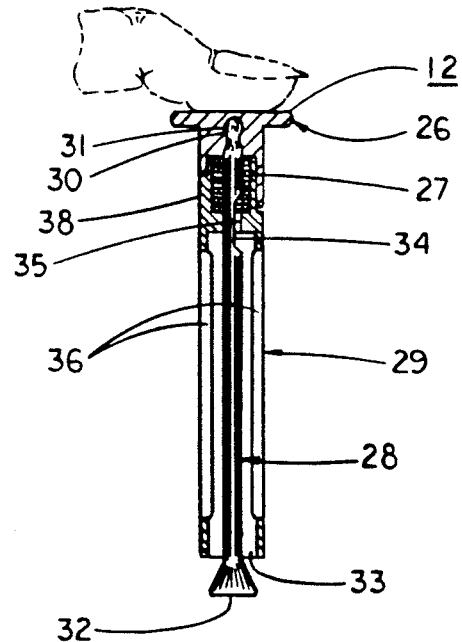
FIG. 4 is a vertical sectional view of the dispenser with the push button depressed and the valve open.

As shown in FIGS. 2–4 the dispenser 12 consists of a push button 26, a spring 27, a rod 28 and a guide 29. The push button 26 is connected to the rod 28 by a knob 30 on the upper end of the rod 28 which is force fitted or otherwise securely fastened into a mating socket 31 in the center of the push button 26. The coil spring 27 surrounds the upper part of the rod 28 and is compressed between the under side of the push button 26 and its seat inside the top end of the guide 29 housing the rod 28. A valve portion 32 on the lower end of the rod 28 seats against an outlet port 33 in the lower part of the guide 29 when in its closed position. The force exerted by the spring 27, which is partially compressed, holds the valve portion 32 of the rod 28 into a sealing relationship with the outlet port 33 of the guide 29. As shown in FIGS. 3 and 4, a vent recess 34 in the upper part of the rod 28 provides an air intake passage for venting the dispenser compartment 15. As the push button 26 is depressed to allow fluid to be discharged from the dispenser compartment 15, the vent recess 34 moves from its closed position, in a guide aperture 35 centrally located in the upper part of the guide 29 as shown in FIG. 3, to its open position shown in FIG. 4. In the open position, outside air is sucked into the dispenser compartment 15, through the passage way formed between the vent recess 34 of the rod 28 and the guide aperture 35 of the guide 29, as the fluid exits the dispenser compartment 15.

A vertical elongated opening 36 provides a fluid passage in the guide 29 as shown in FIG. 2. The opening 36 in the center wall portion of the hollow guide is designed with a vertical length equal to the inside vertical height of the dispenser compartment 15, so that when the dispenser 12 is assembled in the dispenser compartment 15, the opening 36 will be entirely inside the dispenser compartment 15.

As shown in FIGS. 1 and 2 a knurled surface 37 on the outside edge of the top of the push button 26 is designed for finger gripping during rotation to lock or unlock the push button 26. In the locked position illustrated in FIG. 1, a lock bar 38 on the top side of the guide 29 keeps the valve portion 32 of the rod 28 in a sealing engagement with its seat in the outlet port 33 of the guide 29. A flat edge 39 on the bottom of the push button 26 is wedged tightly against an upper end 40 of the lock bar 38 on the guide 29, and a recessed shoulder 41 on the lower edge of the push button 26 contacts the side of the lock bar 38 preventing further clockwise rotation of the push button 26. FIGS. 2 and 3 illustrate the push button 26 rotated about 180 degrees counterclockwise into the unlocked position where an alignment slot 42 in the push button 26 aligns vertically with the lock bar 38 of the guide 29. As the push button 26 is depressed, further compressing the return spring 27, the lock bar 38 of the guide 29 enters the alignment slot 42 in the push button 26 in a mating relationship. FIG. 4 shows the push button 26 fully depressed with the valve portion 32 of the rod 28 off its seat in the outlet port 33 of the guide 29.

In the unlocked position as shown in FIG. 2 an inclined edge 43 on the bottom of the push button 26 is positioned to move over the upper end 40 of the lock bar 38 when the push button 26 is rotated clockwise toward the locked position. As shown in FIG. 1, the flat edge 39 and the shoulder 41 on the push button 26 contact the upper end 40 of the lock bar 38 on the guide 29 preventing the axial movement of the push button 26 required to initate fluid flow from the dispenser compartment 15.

FIGS. 5-9 illustrate the operation of the dispenser for liquids invention.

Figure 5:
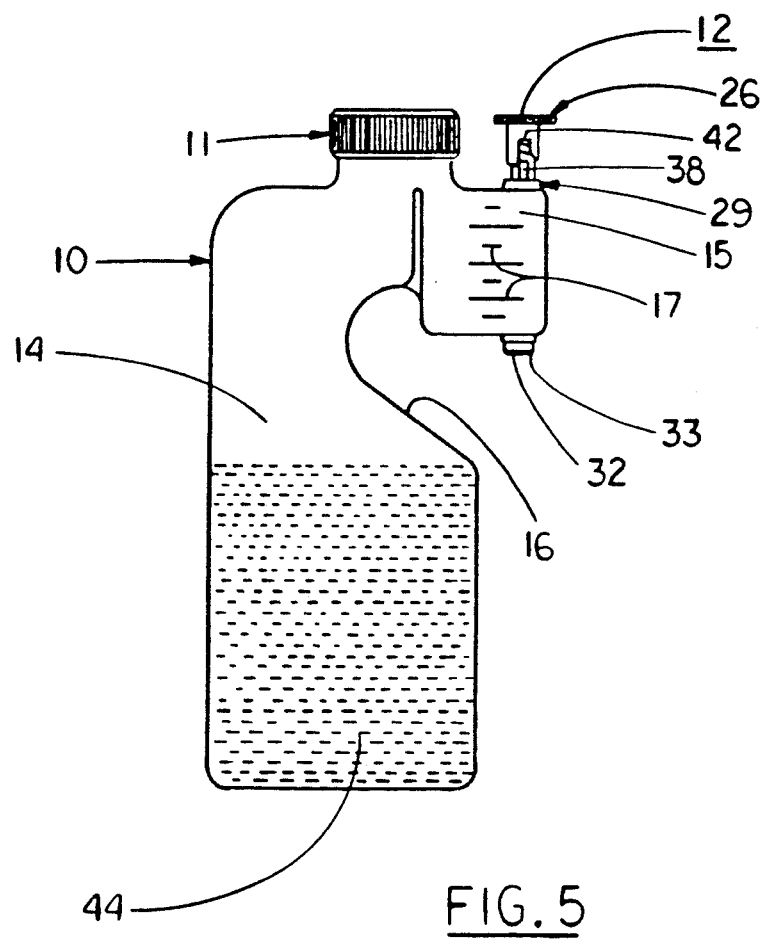
FIG. 5 is a vertical view of the invention showing the reservoir compartment of the container partially filled with fluid.

FIG. 5 shows the invention with a quantity of a liquid 44 in the reservoir compartment 14 of the container 10, and the push button 26 in the unlocked position.

Figure 6:
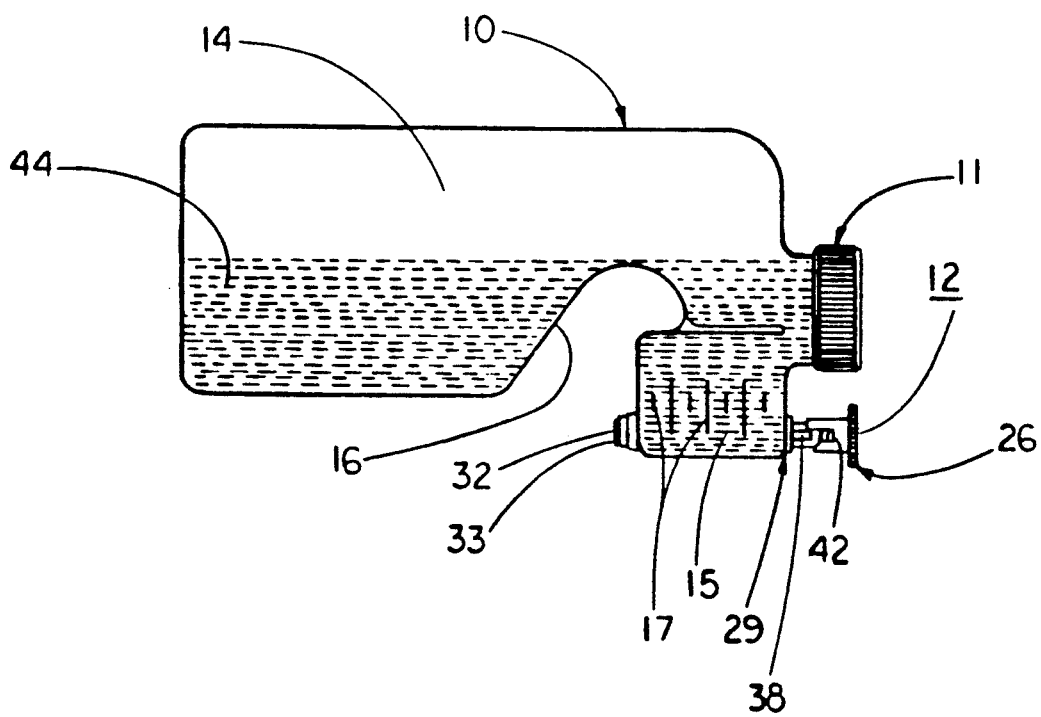
FIG. 6 is a vertical view, similar to FIG. 5, showing the container tilted for filling the dispenser compartment with fluid.

FIG. 6 shows the invention tilted in order to flow a portion of the liquid 44 contained in the reservoir compartment 14 of container 10 into the dispenser compartment 15 of the container 10. Hand gripping the recess 16 of the container 10 facilitates ease of handling and tilting the container 10.

FIG. 7 shows the invention returned to the upright position after being tilted as in FIG. 6. The volume of liquid 44 remaining in the reservoir compartment 14 of the container 10 has been reduced by the volume of liquid trapped in the dispenser compartment 15 of the container 10. The push button 26 remains in the unlocked position as in FIGS. 5 and 6. The translucent plastic material used for molding of the container 10 allows easy observation of the liquid 44 in the dispenser compartment 15 and the graduation lines 17 on the dispenser compartment 15 of the container 10.

FIG. 8 shows the invention in the process of dispensing the liquid 44 from the dispensing compartment 15 of the container 10. The push button 26 is shown in the depressed position with the resulting opening of the valve portion 32 of the rod 28 which allows liquid to exit the outlet port 33 of the dispenser compartment 15 of the container 10. In the design of the invention, the dispenser compartment 15 over hangs the edge of the reservoir compartment 14 so that the liquid 44 discharge, from the outlet port 33 of the dispenser compartment 15, will not flow on to any portion of the reservoir compartment 14 of the container 10. Releasing the push button 26 stops the flow of the liquid from the dispenser compartment. Observation of the graduation lines on the dispenser compartment 15 during the dispensing process provides the capability for relatively percise liquid volume measurements.

FIG. 9 shows the invention after the dispenser compartment 15 has been emptied of the fluid 44 by the dispensing procedure shown in FIG. 8 and discussed above. Also the push button 26 has been rotated clockwise to the closed position with the recessed shoulder 41 on the bottom of the push button 26 in contact with the top side of the lock bar 38 of the guide 29.

In construction, the container 10 is formed with two connected compartments, the reservoir compartment 14 and the dispenser compartment 15. The fluid dispenser 12 is glued, fuzed or otherwise attached by a liquid tight fastening method or procedure into the dispenser compartment 15. The push button 26 of the dispenser 12 is rotated clockwise to the fully locked position shown on FIGS. 1 and 9 preventing leakage and accidental dispensing. Thereafter, the liquid 44 is placed inside the container 10. The closure 11 is then placed on and matingly threaded to the container 10 in a liquid tight engagement.

In operation, to dispense liquid 44 from the container 10, the user tilts the container 10 sufficiently to fill the dispenser compartment 15 with the liquid 44. After the container 10 has been returned to vertical or upright position, the push button 26 is rotated counterclockwise to its fully unlocked position in preparation for the dispensing procedure. The user starts dispensing the fluid 44 by pushing down on the push button 26. Visual observation of the liquid 44 level inside the dispenser compartment 15, together with the graduation lines on the dispenser compartment 15, allows the user to accurately control the volume of liquid 44 dispensed. Pushing the push button 26 all the way down will provide the maximum flow rate for the liquid 44 being dispensed, while pushing the push button 26 slightly will provide a relatively low flow rate which enhances the accuracy of the measurement of the liquid 44 volume dispensed. Refilling of the dispenser compartment 15 is accomplished by retilting the container 10. When container 10 is completely empty, refilling may be accomplished by removing the closure 11 and pouring additional amounts of the liquid 44 into the container 10. Should the user desire to lock the push button 26 at any time to prevent accidental dispensing or leakage, the push button 26 is rotated clockwise to the locked position.

The over hang of the dispenser compartment 15 in relationship with the rest of the container 10 allows flexibility in the utilization of the invention. A user can place the container 10 on a washing machine or the like, with the dispenser compartment 15 positioned so that the fluid 44 being dispensed will flow directly in the appliance. In another type application, a user can dispense the fluid 44 directly into his or her hand. In still a further application, a medicine or liquid food can be dispensed into a drinking cup or other receptacle.

The invention can be of varying sizes limited only by the maximum size a person can carry, tilt and otherwise manipulate. The viscosities of liquid which can be dispensed range from those with a viscosity similar to that of water up to higher viscosity liquids such as liquid soap, liquid detergent and the like. While the invention shows a recess 16 in the upper middle portion of container 10 for hand holding and tilting, other shaped containers designed for easy manipulation and dispensing can also be utilized.

The embodiments of the invention as illustrated and described above are thus seen to represent distinct advances and improvements in the technology of dispensing accurately measured quantities of liquid.

Although the description contains many specifics, these should not be construed as limiting the scope of the invention but as merely providing illustrations of some presently preferred embodiments of the invention. Some examples are: a conventional container handle design can be utilized instead of the recessed hand gripping container design shown; a container design which replaces the guide by providing for the assembly of the rod, the spring and the push button directly into the dispenser compartment portion of the container; a container design which replaces the guide shown with top and bottom inserts placed in the dispenser compartment to provide for the assembly of the rod, the spring and the push button in the dispenser compartment.

It is recognized that various modifications may be made by those skilled in the art, without departing from the spirit and scope of the invention.

Thus, the scope of the invention should be determined by the appended claims and their legal equivalents. rather by the examples given.

I claim:

1. A dispenser for liquid comprising:
   (a) a container for storing a liquid comprising a free standing reservoir compartment supporting and in fluid communication with an attached dispenser compartment extending outwardly from the top of said reservoir compartment and a dispenser vertically positioned in said dispenser compartment, and said container further comprising a neck portion at the junction of said reservoir and dispenser compartments with a closure engagement means for attaching a safety closure to said container, and a gripping means on said container for hand holding said container; (b) a closure cap with sealing means for sealing said container including a container engaging means for attaching said closure cap to said container closure engagement means;
   (c) a barrier dam horizontally formed at the junction of said reservoir compartment and said dispenser compartment inside said neck portion of said container to control fluid flow between said compartments, the operation of said barrier dam being unaffected by the presence of said closure cap on said neck in a sealed position;
   (d) said dispenser including a push button dispensing meams for dispensing liquid from said dispenser compartment and further comprising a locking means to prevent liquid dispensing from said dispenser compartment;
   (e) said dispenser compartment having a fluid measuring means to provide relatively precise liquid volume measurements.

2. The dispenser for liquids defined in claim 1 wherein said container and closure engaging means comprises an external male thread on said neck portion of said container and an internal thread on an inside wall of said closure cap contoured to freely engage said male thread.

3. The dispenser for liquids defined in claim 1 wherein said gripping means for hand holding said container is a recess in the upper middle portion of said container adjacent to said dispenser compartment.

4. The dispenser for liquid defined in claim 1 wherein said sealing means for sealing said closure cap to said container comprises a sealing disc in said closure cap.

5. The dispenser for liquids defined in claim 1 wherein said measuring means to provide relatively precise liquid volume measurements are a plurality of graduation lines on said dispenser compartment in conjunction with said dispenser compartment being transulent, said graduation lines showing liquid volume measurements in ounces and/or milliliters or fractions thereof.

6. The dispenser for liquids in claim 1 wherein a relatively thin vertical web in the upper middle portion of said container connects and supports said dispenser compartment on said reservoir compartment.

7. The dispenser for liquids defined in claim 1 wherein said push button dispensing means comprises a rod, a push button, and a push button connecting means for connecting said push button to an upper end of said rod, a coil spring surrounding the upper part of said rod and compressed between the underside of said push button and the top end of a guide which houses said rod, said locking means comprising a lock bar on said guide adapted to enter matingly an alignment slot in said push button allowing axial movement of said push button and said rod in said guide to move a valve portion on the lower end of said rod on and off a seat in an outlet port defined by a lower part of said guide, and, further, a dispenser venting means to vent said dispenser compartment as said push button is depressed to dispense liquid from said dispenser compartment.

8. The dispenser for liquids defined in claim 7 wherein said push button connecting means comprising a knob on the upper end of said rod force fitted into a mating socket on the underside center of said push button.

9. The dispenser for liquids in claim 7 wherein said dispenser venting means comprises a vent recess in the upper part of said rod cooperating with a guide aperture centrally located in the upper part of said guide to vent said dispenser compartment when said push button is depressed.

10. The dispenser for liquids defined in claim 1 wherein a vertical elongated opening, in a center wall portion of a hollow guide of said dispenser, is positioned inside said dispenser compartment providing a fluid passage through said guide between said dispenser compartment and a dispenser outlet.

11. The dispenser for liquids defined in claim 1 wherein said push button locking means comprises an inclined edge on the botton of a push button positioned to move over an upper end of a lock bar on a guide when said push button is rotated toward a locked position, a flat edge and a shoulder on the bottom of said push button contact said upper end of said lock bar when said push button has been rotated to a fully locked position, wherein a valve portion of a rod attached to said push button seals an outlet port in said guide.

12. The dispenser for liquids defined in claim 1 wherein said container, said closure and said dispenser, with the exception of a spring in said dispenser, are formed of a plastic material.

* * * * *